Sept. 20, 1927.
R. L. HENRY
UNIVERSAL JOINT
Filed Dec. 1, 1926
1,642,775
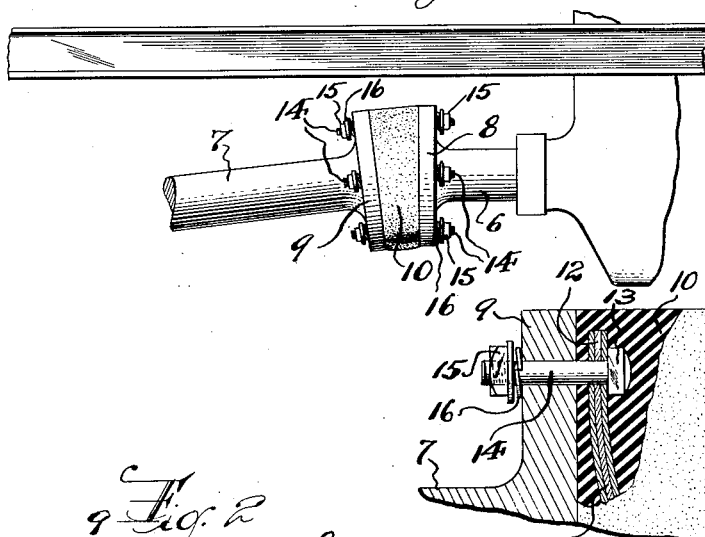
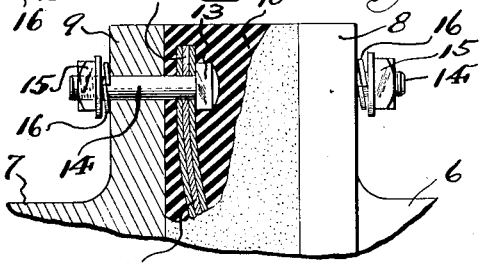
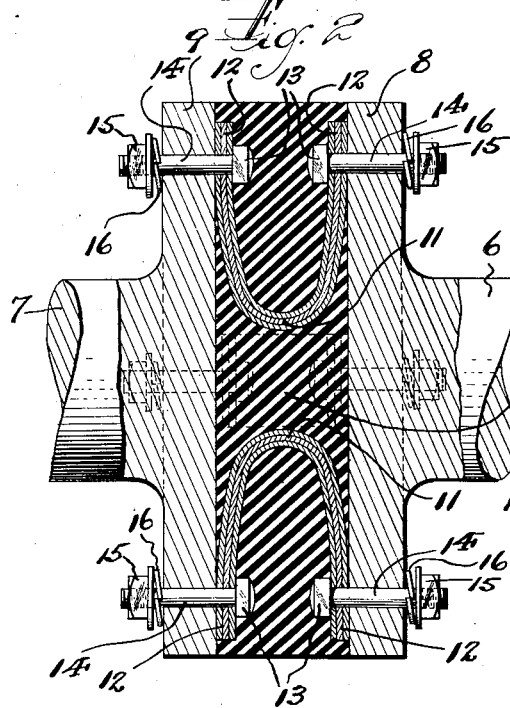
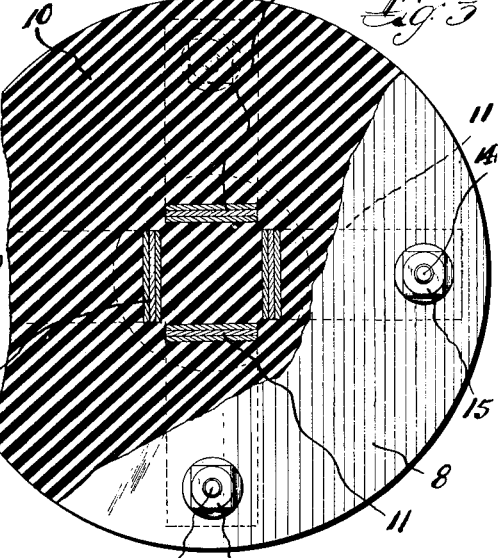
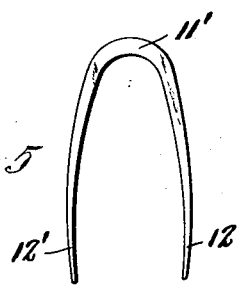
INVENTOR
Ralph L. Henry,
BY
Frautzel and Richards
ATTORNEYS Patented Sept. 20, 1927.

1,642,775

UNITED STATES PATENT OFFICE.

RALPH L. HENRY, OF DETROIT, MICHIGAN, ASSIGNOR TO ALBERT C. HENRY, OF INWOOD, LONG ISLAND, NEW YORK.

UNIVERSAL JOINT.

Application filed December 1, 1926. Serial No. 152,014.

This invention relates to a novel construction of universal joint for use in mechanical power transmission; and the invention has for its principal object to provide a novel construction of universal joint which is practically noiseless and substantially vibrationless in operation, while at the same time operating efficiently to transmit power through the rotation of the parts interconnected thereby.

The invention has for a further object to provide a novel construction of universal joint especially adapted to operatively couple angularly disposed shafts so as to permit of angular motion in all directions, and whereby one shaft may transmit rotary motion to the other through a desired angle of divergence. To this end the novel universal joint comprises a body of resilient material, such as soft rubber, within which is imbedded, in radial disposition, a plurality of curved metallic spring elements extending from one end face to the other end face thereof, the terminal portions of said spring elements having means for positively securing the same to annular flanges with which the opposed ends of angularly related shafts served thereby are provided; said metallic spring elements serving to retain the resilient body member in operative position intermediate the opposed ends of said shafts, and in conjunction therewith being so disposed as to readily yield, by expansion and contraction, to the converging and diverging movements of the shaft flanges under rotation.

Other objects of this invention, not at this time more particularly enumerated, will be clearly understood from the following detailed description of the same.

The invention is clearly illusrtated in the accompanying drawings, in which:—

Figure 1 is a side elevation of the novel universal joint made according to and embodying the principles of this invention;

Figure 2 is an enlarged longitudinal section through said universal joint;

Figure 3 is a central transverse section through said universal joint;

Figure 4 is a fragmentary part section and part side elevation of a slightly modified form of the universal joint; and Figure 5 is a detail side view of a modified form of spring element, for use in connection with said universal joint.

Similar characters of reference are employed in all of the hereinabove described views, to indicate corresponding parts.

Referring now to said drawings, the reference character 6 indicates a drive shaft, and 7 a driven shaft disposed at a desired angle thereto. The drive shaft 6 is provided at its outer end with an annular transverse flange 8, and the opposed end of said driven shaft is provided in like manner with a similar annular transverse flange 9.

The novel universal joint connection is formed in combination with the opposed flanges 8 and 9 respectively of the drive shaft 6 and driven shaft 7, and comprises a body or block 10 of resilient material, such as soft rubber. Said body or block 10 is made of desired thickness, and is preferably provided with a peripheral contour corresponding to the peripheral shape of said flanges 8 and 9. Imbedded in said body or block 10, so as to extend from one side face to the other thereof, and in equi-spaced radial arrangement relative to the central axis of said body or block, are a plurality of bowed metallic spring members 11, the free ends of which are preferably outwardly directed toward the periphery of said body or block. Said spring members 11 may consist of laminate substantially flat U-shaped structures having terminal portions 12, as shown in Figures 2 and 4 inclusive; or, if desired, they may consist in substantially U-shaped bodies 11' having tapered free end or terminal portions 12', as shown in Figure 5; or, other specific forms of spring structure may be provided within the scope of this invention. The terminal portions 12 of the respective spring members 11 are disposed to lie respectively parallel to the respective side faces of the body or block 10. Such terminal portions may have their outer sides flush with the side faces of said body or block 10, as shown in Figure 2; or if desired, they may be disposed within the body or block adjacent to said side faces thereof, as shown in Figure 4. The reference character 13 indicates the heads of fastening bolts 14, which are engaged against the inner sides of the terminal portions 12 of the spring members 11, so as to be imbedded therewith in said body or block 10; the bolt shanks 14 extend outwardly through said terminal portions 12 to project exteriorly from the respective side faces of said body or block 10. In other words the rubber material, of which the resilient body or block 10 is composed, is molded around the spring members 11 and the portions of the headed bolts engaged with the latter.

To operatively assemble the body or block 10 with its spring members 11 in connection with the drive shaft 6 and driven shaft 7, the same is interposed between the opposed flanges 8 and 9 of said shafts, which flanges are suitably perforated to permit the extension therethrough of the exteriorly projecting ends of the bolts 14. The free end portions of said bolt shanks 14 are threaded to receive fastening nuts 15, which, with suitable lock-washers 16, are engaged therewith and screwed home against the outer faces of said flanges 8 and 9 to thus mechanically assemble and operatively secure together the parts making up the novel universal joint. With the parts thus arranged, the resilient body or block 10 is interposed between the adjoining ends of the angularly disposed shafts 6 and 7, with its spring members 11 providing a positive connection between the flanges 8 and 9 of said shafts, whereby the rotary motion of the drive shaft 6 is positively transmitted to the driven shaft 7. It will be apparent, that the resilient block or body 10 with its spring members 11 will readily yield to the relative angular displacements of the shaft flanges 8 and 9, as such parts rotate, without loss of motion. It will also be apparent that the character of the connection is such that a very efficient universal joint is provided, which due to the resiliency of the body or block 10 in which the interconnecting spring members 11 are imbedded, is practically noiseless in operation, and is also adapted to absorb and check vibration. The spring members 11 while serving as an adequate and positive mechanical link between the shafts, whereby the rotary motion of one is efficiently transmitted to the other, are nevertheless also adapted to easily conform or yield to the angular displacements of the abutting rotating parts which they join, so that a smooth, easy, and yet positive transmission of power from one shaft to the other is attained.

While I have shown in the drawings, the flanges 8 and 9 of the shafts 6 and 7 as respectively integrally formed therewith, such arrangement is not essential, and said flanges may, if desired, be made as separable parts otherwise suitably secured to said shafts.

It will also be noticed that I have shown the universal joint connection, as provided with four spring members 11 arranged at right angles one to the other. This arrangement, while deemed preferable, is not essential since a plurality of two or more such spring members in equi-spaced apart relation may be employed, as may be desired.

It will be obvious that the novel universal joint according to this invention may be produced in various sizes and proportional dimensions, according to the character of use to which it is to be put; it will also be obvious that various changes may be made in the general arrangements and combinations of parts making up the novel universal joint within the scope of the appended claims. Hence, I do not limit myself to the exact arrangements and combinations of the various devices and parts as above described in the foregoing specification, nor to the exact details thereof as illustrated in the accompanying drawings, except as may be required by the limitations specified in the appended claims.

Having thus described my invention, I claim:—

1. In a universal joint for power transmission, the combination with angularly aligned shafts having annular flanges at their opposed ends, of a resilient body intermediate said flanges, metallic spring means imbedded within said body to extend between the opposite sides thereof, and mechanical fastening means engaged between the terminal portions of said imbedded spring means and said respective flanges.

2. In a universal joint for power transmission, the combination with angularly aligned shafts having annular flanges at their opposed ends, of a body of substantially soft rubber engaged between the opposed faces of said flanges, curved metallic flat spring members imbedded within said body in radial arrangement to extend between the opposite flange opposing sides thereof, and mechanical fastening means engaged between the terminal portions of said imbedded spring members and said respective flanges.

3. In a universal joint for power transmission, the combination with angularly aligned shafts having annular flanges at their opposed ends, of a body of substantially soft rubber engaged between the opposed faces of said flanges, curved metallic flat spring members imbedded within said body in radially and equi-spaced arrangement, the terminal portions of said spring members being outwardly directed and lying substantially parallel to the opposite flange opposing faces of said body, and fastening means extending outwardly from said terminal portions of said spring members into coupling engagement with said respective flanges.

4. In a universal joint for power transmission, the combination with angularly aligned shafts having annular flanges at their opposed ends, of a body of substantially soft rubber engaged between the opposed faces of said flanges, curved metallic flat spring members imbedded within said body in radially and equi-spaced arrangement, the terminal portions of said spring members being outwardly directed and lying substantially parallel to the opposite flange opposing faces of said body, bolt devices connected with the terminal portions of said spring members with their shanks projecting exteriorly from said main body, said shanks being engaged through said respective flanges, and fastening nuts on the free ends of said shanks for securing the parts in operative assembled relation.

5. In a universal joint for power transmission, the combination with angularly aligned shafts having annular flanges at their opposed ends, of a body of substantially soft rubber engaged between the opposed faces of said flanges, a plurality of U-shaped flat spring members imbedded within said body, said spring members in the direction of their width being disposed in planes parallel with the side faces of said body with their terminal portions outwardly directed and respectively lying substantially parallel to said side faces of said body so as to extend therebetween, said spring members being disposed in radially and equi-spaced relation within said body, and fastening means extending outwardly from said terminal portions of said spring members into coupling engagement with said respective flanges.

6. In a universal joint for power transmission, the combination with angularly aligned shafts having annular flanges at their opposed ends, of a body of substantially soft rubber engaged between the opposed faces of said flanges, a plurality of U-shaped flat spring members imbedded within said body, said spring members in the direction of their width being disposed in planes parallel with the side faces of said body with their terminal portions outwardly directed and respectively lying substantially parallel to said side faces of said body so as to extend therebetween, said spring members being disposed in radially and equi-spaced relation within said body, bolt devices connected with the terminal portions of said spring members with their shanks projecting exteriorly from said main body, said shanks being engaged through said respective flanges, and fastening nuts on the free ends of said shanks for securing the parts in operative assembled relation.

In testimony, that I claim the invention set forth above I have hereunto set my hand this 1st day of November, 1926.

RALPH L. HENRY.